United States Patent [19]

Hayes

[11] 4,150,997
[45] Apr. 24, 1979

[54] WATER BASE FLUORESCENT INK FOR INK JET PRINTING

[75] Inventor: Larry J. Hayes, Bartonville, Tex.

[73] Assignee: Recognition Equipment Incorporated, Dallas, Tex.

[21] Appl. No.: 899,620

[22] Filed: Apr. 24, 1978

[51] Int. Cl.² ................. C09D 5/14; C09D 11/02
[52] U.S. Cl. ..................... 106/15.05; 106/20; 106/22
[58] Field of Search ............ 106/22, 30, 15 R, 20, 106/288 Q

[56] References Cited

U.S. PATENT DOCUMENTS

| 3,870,528 | 3/1975 | Edds et al. | 106/22 |
| 4,021,252 | 5/1977 | Banazak et al. | 106/30 |

FOREIGN PATENT DOCUMENTS 1068874  5/1967  United Kingdom .................... 106/22

*Primary Examiner*—J. Ziegler
*Attorney, Agent, or Firm*—John E. Vandigriff; Thomas W. DeMond

[57] ABSTRACT

An ink composition for utilization in ink jet printing comprising an aqueous solution of a fluorescent pigment, a dye solubilizer, and butyl carbitol. The composition is nonflammable and has a relatively stable viscosity.

20 Claims, No Drawings

WATER BASE FLUORESCENT INK FOR INK JET PRINTING

BACKGROUND OF THE INVENTION

1. Field of the Invention

This invention relates to ink jet printing inks, and, more particularly, this invention relates to ink jet printing inks which are water based and utilize a fluorescent pigment and butyl carbitol in combination.

2. Brief Description of the Prior Art

In U.S. Pat. No. 3,596,275 issued to Sweet on July 27, 1976 and entitled, "Fluid Droplet Recorder," description is made of what is now known in the art as ink jet printing. The basic technique in ink jet printing involves the use of one or more nozzle assemblies connected to a pressurized ink source. Each nozzle includes a small orifice, usually having a diameter on the order of about 0.0015 to 0.0028 inches, which is energized or modulated by an electromechanical transducer to emit a continuous stream of uniform ink drops at a rate on the order of 20 to 200 kilohertz. The stream of droplets is directed onto the surface of a moving writing medium, for example, paper.

Ink jet printers are adapted for making a record on a writing medium by generating a series of ink drops, applying a charge successively on each of the ink drops in response to a signal which is received by the printer. These drops are then directed along a path between two parallel conductive plates. A deflection field, which is generated at a bias potential, is applied to these plates with the result that the ink drops are deflected so that they reach the writing medium (or the material). They provide a representation characteristic of the information contained in the signals. The general configuration of ink systems employed within ink jet printers includes an ink sump or reservoir which stores ink. The sump feeds a compressor which in turn feeds a conduit, which is connected to a nozzle. An electromechanical transducer is employed to vibrate the nozzle at some suitable, high frequency, which after the ink is ejected through an orifice of the nozzle in a stream, causes the stream to break into individual drops. It is desired for proper charging of the individual drops that the breakup of the stream occur within the charging slot. The charging slot is the most desirable point along the path of the stream for the actual charge on each individual drop to be placed.

It can be seen from this brief description of ink jet printing systems that the ink used must possess a unique combination of properties. The primary parameter considered in formulating ink jet printing ink should be having a viscosity for the ink within the range of about 1.0 to 10.0 centipoise at 75° F. and preferably 2.0 to 6.0 centipoise. As will be appreciated by those skilled in the art, the viscosity of the composition varies somewhat with the nature of the particular ink jet printing apparatus.

It is desirable that the ink used in ink jet printing be recycled. In other words, the ink drops which are not used to print on the writing medium are collected in a drain and returned to the ink sump. The ink is again pressurized and moves through the conduit and toward the nozzle. If the ink is not utilized for writing purposes it collects in the drain again and returns to the sump. During its transit between the nozzle and the drain ink is exposed to the ambient air. Evaporation can and does occur. It is well known in the art that the viscosity of the ink is one of the major parameters which determines the location along the path of the stream of ink where the breakup into individual drops occurs. The volume, distribution, and shape of drops are also viscosity influenced. A change in the viscosity of the ink (or writing fluid) causes the point at which the breakup occurs to be altered which in turn effects the charging of the drops in response to the signal present on the charging slot. The magnitude of the deflection of each individual drop is directly related to its particular charge. Thus, a change in the breakup point of the drops will alter the point of impact of the individual drops onto the writing medium.

In order to improve the contrast between the writing medium and the ink, it is desirable that the ink be fluorescent for certain application such as optical reading systems. The use of organic fluorescent pigments in various fields is well known as shown in U.S. Pat. No. 2,940,937 issued to O'Brien on June 14, 1960 and entitled "Fluorescent Printing Ink." The formulation of dye stuffs involves curing of resinous material, followed by the grinding of the mass into a powder.

Further it is highly desirable that the ink utilized be nonflammable. The heat generated in a high speed transport with intensive illumination etc. can be so high as to ignite flammable inks. It is therefore desirable that water based inks be utilized in ink jet printing and that those water based inks be nonflammable.

Because the orifice diameters of the nozzle are on the order of 0.0015 to 0.0028 inches, nozzle clogging can become a major problem. Therefore, the ink of an ink jet printing system can not contain particulate material which could clog the orifice of the nozzle nor can it be an ink which dries and plugs the orifice when the system is not in use.

An additional requirement for an ink jet printing ink is that is must be electrically conductive. It is also highly desirable that the ink not smear and have a relatively fast drying time. Since it is required that the ink not smear on the writing medium, the ink jet printing ink must have the property of being readily absorbed into the writing medium. In other words the ink must have the characteristic of wetting. Wetting is the property of a liquid describing its ability to penetrate a writing medium as defined by a loss of reflectivity.

Various formulations of ink for ink jet printing systems are known in the arts such as U.S. Pat. No. 3,994,736 issued to Hertz et al on Nov. 30, 1976 and entitled "Ink Composition for Ink Jet Writing," U.S. Pat. No. 3,846,141 issued to Ostergren on Nov. 5, 1974 and entitled "Jet Printing Ink Composition," and U.S. Pat. application Ser. No. 804,429 by Redick and McJohnson filed on June 7, 1977 and entitled "Fluorescent Jet Printing Ink Composition."

None of the prior compositions are fluorescent aqueous inks for ink jet printing which are nonflammable and have a relatively short time for absorbtion by the writing medium. Additionally, the prior constructions do not show a fluorescent ink for ink jet printing which is both nonflammable and has a brief wetting time and in addition has relatively small changes in viscosity when utilized over a relatively long period of time in an ink recycling system within an ink jet printer.

SUMMARY OF THE INVENTION

The invention comprises a composition of matter possessing characteristics, properties, and relation of components which is exemplified of a combination hereinafter described. The aqueous solvent for the ink for this invention is deionized water. Ammonium hydroxide is blended into the deionized water. Ethylenedinitrilo tetraacetic acid tetra sodium (hereinafter referred to as EDTA), a fluorescent surfactant, a bactericide, and morpholine can be added at this time if desired. EDTA is a chelating agent for complexing metal ions such as iron, zinc, or magnesium present within the fluid mixture in preventing the precipitation of metal ions dessolved in the water or present in the fluorescent pigment to be added in a subsequent step. The fluorescent pigment is a mixture of dye and organic resin. Thus, EDTA reduces the possibility of clogging the orifice of the ink jet printing nozzle. The morpholine functions to retard the hydrolysis of the quaternary salt which is formed by the reaction of the present pigment and the organic base. The base, which is added acts as a pigment solubilizer and can be any well known amine base, for example, ammonium hydroxide, as well as any alkali, for example, sodium hydroxide, is added and blended into the mixture. The fluorescent pigment is then slowly added to the aqueous solution. The purpose of the ammonium hydroxide is to render the fluorescent pigment soluble in water by forming the water soluble quaternary salt. 2-(2-Butoxyethoxy) ethanol (hereinafter referred to as butyl carbitol) is then added to the mixture to hold the fluorescent pigment in solution in the composition. The butyl carbitol functions as both a dye stabilizer and wetting agent. The resistivity of the ink is provided by the quaternary salt formed by the ammonium hydroxide and the fluorescent pigment. The butyl carbitol acting as a wetting agent decreases the time required for the ink to be absorbed into the writing medium and thus decreases any smearing problem which exists. If desired a fluorescent surfactant such as Zonyl FSN, FSA, and FSJ can be added to the ink. The ink jet printing ink formed according to the description herein is nonflammable.

DESCRIPTION OF THE PREFERRED EMBODIMENT

The infrastructure of the present invention resides in a new and improved composition suitable for use within an ink jet printing system comprising an aqueous solution of a fluorescent pigment, an base, and butyl carbitol. In addition, morpholine can be added to retard the hydrolysis of the quaternary salt which is formed by the reaction of the fluorescent pigment and the base. EDTA can be added to the composition of the ink to act as a chelating agent to complex any metal ions present in the water or the fluorescent pigment. A bactericide can be added to improve shelf life and a fluorescent surfactant can be added if desired to improve the absorption characteristics of the ink.

The printing ink formulated in accordance with the present invention has the desired parameters for utilization within an ink jet printing system, and the viscosity of the composition is subject to only slight variation as the ink is recycled within an ink jet printer system. In addition, the ink composition of this invention is nonflammable which eliminates the risk of fire during usage. Further, the ink of the present formulation is fluorescent and can maintain its fluorescence over a long storage interval. Also, the ink of the present invention has excellent absorption characteristics and a short wetting time which eliminates smear and increases the utility of the material.

Finally, the ink needs no reconstitution during use. Reconstitution is defined as the addition of solvent, either water or butyl carbitol, to the ink during use to replace that which has evaporated.

The invention therefore comprises the composition of matter possessing the characteristics, properties, and the relationship of components which is exemplified in the composition hereinafter described.

The general parameters of ink jet printing inks vary somewhat between the types of nozzles, the pressure of the ink within the nozzle, the type of nozzle utilized, and the operating frequency. Other differences within the various configurations of ink jet printing systems can cause the optimum parameters to vary slightly. The generally accepted parameters for ink compositions to be utilized in ink jet printing are set out herebelow. The viscosity of the ink composition, which should be between 1.0 to 10.0 centipoise is preferably from 2.0 to 6.0 centipoise. The required surface tension of between 20 and 60 dynes per centimeter is preferable. The specific gravity (or density) should be between 1.0 and 1.06.

The concentration of the fluorescent pigment should be between 10 and 20 percent, preferable at approximately 16 percent, in order to enhance the contrast between the light reflected from the writing medium and the fluoresced light emitted by the fluorescent pigment. For the reason that a charge is applied to the ink, a resistivity of between 0 and 1000 ohms-centimeters is desirable. Further, as set forth above, a long shelf life, fluorescense, nonflammability, and recyclability represent other desired qualities of an ink composition for ink jet printers. In order to provide the ink with the property of nonflammability, it is highly desirable that the ink be water based and that the dye stabilizer, which is butyl carbitol, be nonflammable. The components of two formulations of the ink of the present invention and the percentages by weight of each component thereof are shown in Table 1. All percentages set forth herein are by total weight unless stated otherwise. All measurements including viscosity were performed at 75° F. Two examples of the ink along with the viscosity, the surface tension, and the density of each composition are also shown in the table. Although EDTA, a particular bactericide (Dowicil 75), morpholine, and zonyl FSN are shown, they can be eliminated from the composition.

Table 1

| Ingredient | % | Viscosity | Surface Tension | Density |
|---|---|---|---|---|
| Formulation Data | | | | |
| Water | 74.7 | 2.85 | 38.0 | 1.055 |
| EDTA | 0.04 | | | |
| Dowicil 75 | 0.02 | | | |
| Morpholine | 1.3 | | | |
| NH₄OH | 3.2 | | | |
| Pigment | 15.3 | | | |
| Butyl carbitol | 5.4 | | | |
| Second Formulation | | | | |
| Water | 72.94 | 2.89 | 36.7 | 1.054 |
| EDTA | 0.04 | | | |
| Dowicil 75 | 0.02 | | | |
| Morpholine | 1.00 | | | |
| NH₄OH | 4.00 | | | |
| Dye | 16 | | | |
| Butyl carbitol | 6.00 | | | |
| Zonyl FSN | 0.01 | | | |

The weight percentages of EDTA can vary from 0 to 0.1 percent. Further, it has been found that the percentage of weight of butyl carbitol can vary from 3 to 20 percent although for certain nozzles having particular viscosity requirements a percentage of butyl carbitol of between 5 to 7 has been found to be particularly useful. The percentage of morpholine can vary from between 0 to 2 percent by weight. And the Dowicil 75 can vary from 0 to 0.05 percent. Further, it has been found that the percentage of weight of ammonium hydroxide can vary from between 3 to 5 percent. Of course, the variations in the percentage of ammonium hydroxide, pigment, etc., causes the percentage by weight of water to vary.

The term dye solubilizer is used here and refers to a base which is one of the many amine bases, for example, ammonium hydroxide as shown herein as well as alkali bases such as sodium hydroxide. The term dye stabilizer as used herein refers to the function of butyl carbitol within this particular ink jet printing ink composition. Wetting agent is a term describing a substance within the ink which increases the ability of the ink to be absorbed into the writing medium. In other words, the term wetting describes the function of reducing the amount of time required for the ink to be absorbed into the writing medium for the purpose of reducing any smear problems which might occur.

In constructing the ink the following procedure is employed. The deionized water is placed in the container of a mixer or blender, for example, a shear blender, and the bactericide, EDTA, morpholine, and the fluorescent surfactant is added thereto if desired. A bactericide which has been found to be particularly useful in this ink composition is Dowicil 75. The bactericide retards the growth of microrganisms which could degrade the ink and can be eliminated if it is not necessary to inhibit the growth of bacteria. The bactericide therefore adds to the shelf life of the ink. In general, a percentage by weight of bactericide of 0.02 percent has been found to be generally useful. EDTA is a chelating agent which complexes metal ions such as iron, zinc, magnesium etc., and prevents the precipitation of those metal ions from the ink. It is well known in the art that such impurities as iron, zinc, calcium, and magnesium exsist in most fluorescent pigments. The percentage by weight of the total composition of EDTA is approximately 0.04 percent. EDTA acting as a chelating agent reduces plugging of the orifice of the ink jet nozzle by preventing the formation of water and insoluble carbonate salts when the ink is exposed to the ambient air which contains carbon dioxide.

The fluorescent pigment which is, for example, blaze orange 122-8524A manufactured by the Dayglo Color Corporation of Cleveland, Ohio, are not directly water soluble, but can be rendered water soluble by neutralization with base materials. The ammonium hydroxide functions to render the fluorescent pigment soluble in water. The morpholine, if added, functions to retard the hydrolysis of the quaternary salt which is formed by the reaction of the fluorescent pigment and the ammonium hydroxide.

One aspect of shelf life is the maintenance of the fluorescence of the fluorescent pigment, and this is extended by maintaining the pH of the ink at some value close to 8.0. The pH can go below about 7.1 without loss of fluorescent brightness once the pigment has been dissolved. However, values of pH above 8.5 severely degrade the fluorescent property of the fluorescent pigment.

After EDTA, the bacetricide, morpholine and a surfactant, if any are desired, are added to the water, the fluorescent pigment, which is 16 percent by weight of the composition, is slowly added and blended until dissolved into the ink composition. The pH of the solution is measured and adjusted by adding more ammonium hydroxide until a pH of between 7.5 and 8.5 is reached. The upper limit of the desired pH is 8.5 because of the problem of shelf life as discussed above. The lower limit of 7.5 must not be crossed because of reduced solubility of the pigment. A pH of 8.0 has been found to be desirable.

The butyl carbitol which acts as a dye stabilizer and wetting agent is then added to and blended into the mixture. The percentage by weight of butyl carbitol can be as stated above between 3 and 20 percent but preferably for ink jet printing between 5 and 7 percent. The dye stabilizer, butyl carbitol, acts to stabilize the fluorescent pigment in solution with the water and therefore extends the shelf life of the ink. Also, if added, the bactericide increases the shelf life of the ink composition because of its ability to retard the growth of bacteria. The ammonium salt formed by the fluorescent pigment and the ammonium hydroxide gives the ink its required resistivity.

The butyl carbitol which is utilized as a dye stabilizer has a boiling point of approximately 446° F. Thus, the mixture of butyl carbitol and water will not burn and is noncombustible.

The viscosity of the ink composition is primarily controlled by the water, the pigment, and the butyl carbitol. Because the percentage of weight of butyl carbitol is so small, variations caused by evaporation of the solvents as the ink is recycled has little effect on the viscosity of the ink composition.

As can be seen from the ink composition shown in Table 1 the first ink composition has a viscosity of 2.85 centipoise and the second ink composition has a viscosity of 2.89 centipoise. Note that the percentage of butyl carbitol has varied from 5.4 percent by weight in composition one to 6.00 percent in compositon two. The difference between the two viscosities is only 0.04 which is negligible and still within the required range for ink jet printing inks as discussed above. Also, the density of the two compositions changes by only 0.001. Therefore, density changes during use have been found not to be a problem.

Therefore, it has been found that during recycling butyl carbitol need not be added to the composition. An ink, as described herein, was subjected to an evaporation study which was equivalent to one month in an ink recycling system. The viscosity of the ink at the beginning of the test was 3.11 centipoise and at the end of the test the viscosity was 3.58 centipoise. Thus, the ink has remained within the parameters for ink jet printing inks. Neither water or butyl carbitol nor any other substance was added to the ink during the evaporation study. In other words, the ink was not reconstituted.

It may in some instances be useful after mixing the ink composition to utilize filtration of the composition to remove any particulate such as contamination or undissolved dye. Such particulates could clog or obstruct orifice of the nozzle of an ink jet printer. It is highly desirable to remove all particulate matter greater than one micron to avoid any possible obstruction of the orifice of the ink jet printer because the diameter of the orifice of the nozzle is usually on the order of 0.0015 to 0.0028 inches.

As shown in Table 2 the wetting time of water is greater than 5 minutes. Butyl carbitol at 100 percent has a wetting time of 4.5 minutes. It should be noted however that at percentages of between 9.1 percent and 17.4 percent the wetting time varies between 22 seconds and 12 seconds. It is desirable to have a short wetting time in order that the ink cannot be smeared as a document which has been printed upon moves through other parts of the transport after the ink drops have impacted the writing medium.

Table 2

Wetting Time Versus Water Mixtures

| Sample | Concentration | Setting Time |
|---|---|---|
| Water (only) | 100% | >5 min. |
| Butyl carbitol | 100% | 4.5 min. |
| Butyl carbitol | 4.8% | 1.3 min. |
| Butyl carbitol | 9.1% | 22 sec. |
| Butyl carbitol | 13.8% | 15 sec. |
| Butyl carbitol | 17.4% | 12 sec. |
| Butyl carbitol | 23.1% | 12 sec. |

As can be seen from Table 2 the water and the butyl carbitol have a synergistic effect, i.e., the wetting time of a mixture butyl carbitol and water is considerably less than the wetting of either water or butyl carbitol alone. Butyl carbitol was determined to be the dye stabilizer and wetting agent of choice by an emperial selection. Wetting time is the amount of time it takes for a drop of liquid to penetrate a document as defined by a loss of reflectivity. The test utilized was substantially similar to the Test Method 39-1971 of the American Association of Colorist and Chemist Manual. The loss of reflectivity occurs when the surface tension bubble which has formed a smooth air to ink boundary layer is broken by the absorption of the ink into the writing medium. In the test, a relatively constant size drop is placed on manilla paper. The reflection of the drop was observed until the reflectivity disappeared. At the instant the reflectivity became absent the drop was considered to be absorbed.

In summary, the deionized water and a base such as ammonium hydroxide are blended together. A bactericide, EDTA, morpholine, and a surfactant can be added to the mixture prior to the addition of the ammonium hydroxide, if desired. The ammonium hydroxide acts as a dye solubilizer for the fluorescent pigment which is slowly added and blended into the mixture. The blending process is continued until all of the fluorescent pigment is dissolved into the mixture. The ammonium hydroxide is added to the mixture to adjust the pH below 8.5 and specifically within the range of 7.5 to 8.5.

Thus, the ink composition described herein forms a nonflammable ink having a relatively stable viscosity, a long shelf life, and does not need reconstitution. The ink has a viscosity within the range necessary for ink jet printing. Therefore, it is shown herein an ink composition which has fluorescent properties and other highly desirable properties for an ink jet printing ink.

It will be understood that various changes and modifications can be made in the details, procedure, formulation, and use without departing from the spirit of the invention, especially as defined in the following claims.

What is claimed is:

1. A fluorescent ink composition for ink jet printing comprising an aqueous solution of approximately 10% to 20% by weight of fluorescent pigment rendered soluble by a sufficient amount of base to produce a pH of between 7.5 and 8.5, and of 2-(2-Butoxyethoxy)ethanol within the range of 3 to 20% by weight, the ink composition having a viscosity within the range of 1.0 to 0.10 centipoise.

2. Fluorescent ink composition as set forth in claim 1 wherein said base is ammonium hydroxide.

3. Fluorescent ink composition as set forth in claim 1 wherein the composition has a viscosity within the range of 2.0 to 6.0 centipoise.

4. Fluorescent ink composition as set forth in claim 1 including a bactericide to inhibit bacteria growth.

5. Fluorescent ink composition as set forth in claim 4 wherein said bactericide comprises up to 0.05% by weight of the composition.

6. Fluorescent ink composition as set forth in claim 1 including a surfactant.

7. Fluorescent ink composition as set forth in claim 6 wherein the surfactant comprises up to 0.01% by weight of the composition.

8. Fluorescent ink composition as set forth in claim 1 including Ethylenedinitrilo tetraaceltic acid tetra sodium acting as a chelating agent.

9. Fluorescent ink composition as set forth in claim 8 wherein the Ethylenedinitrilotetraaceltic acid tetra sodium comprises up to 0.1% by weight of the composition.

10. Fluorescent ink composition as set forth in claim 1 including morpholine.

11. Fluorescent ink composition as set forth in claim 10 wherein the morpholine comprises up to 2% by weight of the composition.

12. An aqueous, nonflammable fluorescent ink composition for ink jet printing systems having a recycling system in which the composition is exposed to ambient air comprising:
   a. a fluorescent pigment of approximately 16% by weight;
   b. base of between 3% and 5% by weight for rendering the fluorescent pigment water soluble by producing a pH between 7.5 and 8.5; and
   c. 2-(2-Butoxyethoxy)ethanol of between 3 to 20% by weight.

13. Ink compisition as set forth in claim 13 wherein the 2-(2-Butoxyethoxy)ethanol is within the range of 5 to 10% by weight.

14. Ink composition as set forth in claim 12 wherein said composition has a viscoisty within the range of 2.0 to 6.0 centipoise.

15. Ink composition as set forth in claim 12 wherein the base is ammonium hydroxide.

16. Ink composition as set forth in claim 12 including a bactericide comprising up to 0.05% by weight.

17. Ink composition as set forth in claim 12 including a surfactant comprising up to 0.01% by weight.

18. Ink composition as set forth in claim 12 including EDTA acting as a chelating agent and comprising up to 0.1% by weight.

19. Ink composition as set forth in claim 12 including morpholine comprising up to 2% by weight.

20. An ink composition comprising in combination:
   a. An aqueous solution of about 10% to 20% by weight of fluorescent pigment rendered soluble by ammonium hydroxide within the range of 3% to 5% by weight; and
   b. 2-(2-Butoxyethoxy)ethanol within the range of 3% to 20% by weight, said the ink composition having a viscosity between 1.0 and 10.0 centipoise and being nonflammable.

* * * * *